Patented June 9, 1936

2,043,965

UNITED STATES PATENT OFFICE 2,043,965

PRODUCING AMINES

Karl Smeykal, Leuna, Germany, assignor to I. G. Farbenindustrie Aktiengesellschaft, Frankfort-on-the-Main, Germany No Drawing. Application October 17, 1934, Serial No. 748,716. In Germany October 21, 1933

6 Claims. (Cl. 260—127)

The present invention relates to a new process of producing amines containing at most one hydrogen atom directly attached to a nitrogen atom.

It has already been proposed to cause alcohols to react with ammonia in the presence of catalysts. Only alcohols of low molecular weight could hitherto be used, however, and the reaction could only be carried out under atmospheric pressure. By reason of side reactions, alcohols of high molecular weight could only be converted into the corresponding amines with very low yields by the said method.

I have found that amines containing at most one hydrogen atom directly attached to a nitrogen atom can be prepared in a very advantageous manner by causing aliphatic alcohols (which term means open chain aliphatic and cycloaliphatic alcohols) having at least 8 carbon atoms in the molecule to react at elevated temperatures under pressures of at least 50 atmospheres with aliphatic amines containing at least 1 hydrogen atom directly attached to a nitrogen atom, the alkyl radicles of which amines contain at most 5 carbon atoms, the reaction being carried out in the presence of catalysts capable of splitting off water. Aliphatic or cycloaliphatic alcohols of high molecular weight suitable for the process according to this invention are, for example, octyl, dodecyl, tetradecyl, cetyl, octodecyl and oleyl alcohols, montanol, naphthene alcohols and mixtures of the said alcohols, such as are obtainable, for example, by the catalytic reduction of fatty oils, fats or waxes, such as, for example, coconut oil, palm kernel oil and soy bean oil. Furthermore, the alcohols obtainable by the incomplete, liquid phase oxidation of non-aromatic hydrocarbons of high molecular weight, such as, for example, paraffin wax, mineral oil fractions or hydrogenation products of coals and tars and also those obtainable by the reduction of fatty acids obtained by the said oxidation of paraffin wax or the like are also suitable.

As amines there may be mentioned methylamine, ethylamine, propylamine, isopropylamine, methylbutylamine, methylamylamine and diethylamine. Mixtures of the said amines such as, for example, mixtures of monomethylamine and monoethylamine, monomethylamine and dimethylamine or dimethylamine and diethylamine, may also be used.

Small amounts of ammonia or tertiary amines of low molecular weight do not exert any injurious influence on the course of the reaction. It is therefore possible to employ for the preparation of amines according to the present invention the readily accessible crude mixtures of bases obtainable by the reaction of ammonia with alcohols or ethers of low molecular weight. It is only necessary to take care that the amounts of primary and secondary amines used up in the reaction are continually replaced so that the concentration of ammonia or tertiary amines in the mixture does not become too great. For a smooth course of the reaction it is especially advantageous to employ the amines in considerable excess with respect to the alcohol of high molecular weight; the amines thus remaining unconverted may be employed again for the reaction with alcohols of high molecular weight.

As catalysts capable of splitting off water for use in the process according to this invention there may be mentioned, for example, aluminium oxide, thorium oxide and silica gel. Generally speaking, no reduction in the activity of the said catalysts takes place even after use for several months. The reaction may be carried out between about 200° or 250° C. and 425° C. The most favourable temperatures for the process lie usually between 300° and 400° C. especially between 350° and 370° C. But temperatures above or below the said limits may be employed depending on the nature of the initial materials employed. It is preferable to employ pressures between 150 and 200 atmospheres, but lower pressures such as 50, 75, 100 or higher pressures such as 250, 300 or 500 atmospheres may also be used.

In the said manner very good yields of amines (or mixtures of such amines) having the following constitution are obtained:

in which $R_1$ is an open chain aliphatic or cycloaliphatic radicle containing at least 8 carbon atoms, $R_2$ is hydrogen or an alkyl radicle with at most 5 carbon atoms and $R_3$ is an alkyl radicle with at most 5 carbon atoms. The amines of high molecular weight obtained may be employed as such or in the form of their salts as assistants in the textile and related industries with great advantage.

The following examples will further illustrate the nature of this invention, but the invention is not restricted to these examples.

Example 1

1 part by volume of normal dodecyl alcohol is mixed with 8 parts by volume of anhydrous liquid dimethylamine and the mixture is pressed into a high pressure tube in which, after evaporation, it is led at 360° C. under a pressure of 190 atmospheres over a catalyst consisting of pieces of alumina gel. The amount of mixture (measured in the liquid state) which is led per hour over the catalyst amounts to about 2.2 times the volume of the catalyst. After cooling the reaction product, the pressure is reduced to about 5 atmospheres, the excess of dimethylamine being separated by distillation at the said pressure. The residue is subjected to fractional distillation in vacuo whereby, after the distillation of the water formed during the reaction, dimethyl-dodecylamine passes over in a yield of 90 per cent. This good yield remains practically unaltered for long periods of time; for example, after continuously carrying out the reaction for 14 days the yield is still 90 per cent.

The color of the catalyst after use is substantially the same as before.

Example 2

A mixture of alcohols (obtained by the catalytic reduction of coconut oil with hydrogen and consisting mainly of dodecyl alcohol and myristyl alcohol) is mixed at 50° C. with eight times its amount of liquid monomethylamine, the mixture then being led at 360° C. under a pressure of 80 atmospheres over a catalyst consisting of pieces of alumina hydrate consolidated with kaolin. The amount of the mixture of alcohols and methylamine (measured in the liquid state) which is led over the catalyst per hour is about 2.2 times the volume of the catalyst.

After cooling the resulting reaction products, the pressure is first reduced to about 5 atmospheres and the excess of methylamine distilled off under the said pressure; the methylamine may be employed again. The resulting residue is distilled in vacuo whereby, after an aqueous first runnings, a mixture of methyl-dodecyl-amine and a small amount of dimethyl-dodecyl-amine is obtained in a yield of 90 per cent of the theoretical yield.

After 20 days of continuous operation practically no decrease of the yield is observed. The catalyst used is only slightly darker than was the catalyst before use.

Example 3

A mixture of coconut oil alcohols, such as is employed in Example 2, is mixed with nine times its amount of a liquid mixture of crude bases obtainable by the reaction of methyl alcohol with ammonia and consisting of 10 per cent of ammonia, 60 per cent of monomethylamine, 28 per cent of dimethylamine and 2 per cent of trimethylamine, and then led at 350° C. under a pressure of 150 atmospheres over a catalyst consisting of pieces of alumina gel. The quantity of the mixture of alcohols and methylamine which is led over the catalyst per hour amounts to about 2.5 times the volume of the catalyst. The reaction products are condensed, the pressure is reduced to 10 atmospheres and the methylamine bases are distilled off. The residue is worked up by distillation in vacuo. A yield of from 90 to 92 per cent of a product consisting of a mixture of methylated dodecylamine and tetradecylamine is obtained.

Example 4

Oleyl alcohol is mixed with eight times its amount of liquid dimethylamine and the mixture is led at 360° C. under a pressure of 200 atmospheres over a catalyst consisting of pieces of alumina gel which have been consolidated with zinc phosphate. The quantity of the mixture of alcohol and amine (measured in the liquid state) which is led per hour over the catalyst amounts to about 2.2 times the volume of the catalyst. After cooling the reaction product, the pressure is reduced to about 5 atmospheres and the dimethylamine continuously distilled off under pressure. The pressure is then released and the reaction product distilled in vacuo. Dimethyl-oleylamine is obtained in a yield of 90 per cent.

Example 5

A mixture of 1 part of normal dodecyl alcohol and 10 parts of mono-isobutylamine is continuously led at 370° C. under a pressure of 200 atmospheres through a high pressure pipe which is charged with a catalyst consisting of pieces of alumina gel. The quantity of the mixture of alcohol and amine (measured in the liquid state) which is led over the catalyst per hour amounts to 2.8 times the volume of catalyst. After cooling the reaction product, the pressure is released and the excess of isobutylamine removed from the reaction mixture by fractional distillation. The distillation residue is subjected to fractional distillation in vacuo. A mixture of mono-isobutyl-dodecylamine with a little di-isobutyl-dodecylamine is obtained in a yield of from about 85 to 90 per cent of the theoretical yield.

Example 6

A mixture of 1 part of normal dodecyl alcohol and 10 parts of diethylamine is pressed continuously into a high pressure pipe and led at 370° C. under a pressure of 200 atmospheres over a catalyst consisting of pieces of alumina gel. The quantity of the mixture of alcohol and amine (measured in the liquid state) which is led over the catalyst per hour amounts to 2.75 times the volume of the catalyst. The reaction mixture is cooled and the pressure released. The excess of diethylamine is then removed from the reaction mixture by fractional distillation at atmospheric pressure. The distillation residue is fractionally distilled in vacuo whereby, after the water formed during the reaction has been distilled off, a good yield of diethyl-dodecylamine distils over.

Example 7

Normal octodecyl alcohol is mixed with 8 times its amount of liquid anhydrous monomethylamine and led at 350° C. under a pressure of 200 atmospheres over a catalyst consisting of alumina gel. The quantity of the mixture which is led over the catalyst per hour amounts to about 2.2 times the volume of the catalyst. The reaction product is worked up in a manner similar to that in Example 4. A yield of 90 per cent of a mixture of methyloctodecylamine in a preponderating amount with a little dimethyloctodecylamine is obtained.

If octodecyl alcohol is reacted with 5 times its volume of dimethylamine (measured while liquid) at 380° C. under a pressure of 200 atmospheres in the presence of the said catayist, dimethyl-octodecylamine is formed in a yield of about 90 per cent. The yield remains excellent even after continuously carrying out the reaction for long periods of time; for example after 12 days it is the same as at the beginning.

Example 8 n-Octodecyl alcohol is mixed with 8 times its weight of liquid anhydrous dimethylamine and the mixture is passed at 350° C. under a pressure of 200 atmospheres over a catalyst which consists of alumina gel. The volume of the said mixture which is passed per each hour over the catalyst is about 2.2 times the volume of the catalyst. The reaction product is worked up in an analogous manner as described in Example 4. Dimethyloctodecylamine is obtained in a yield of 90 per cent.

From the beginning of the procedure a product is obtained which contains 4.3 per cent of nitrogen. If the process is carried on for longer periods of time, for example after 12 days of working, the product obtained has the same content in nitrogen and the yield is about 90 per cent.

The catalyst used is not much darker than before use.

What I claim is:—

1. The process of producing amines containing at most 1 hydrogen atom directly attached to a nitrogen atom which comprises causing an aliphatic alcohol having at least 8 carbon atoms in the molecule to react in the presence of a catalyst capable of splitting off water at a temperature above about 200° C. under a pressure of at least 50 atmospheres with an aliphatic amine containing at least 1 hydrogen atom directly attached to a nitrogen atom, any alkyl radicle of the said amine containing at most 5 carbon atoms.

2. The process of producing amines containing at most 1 hydrogen atom directly attached to a nitrogen atom which comprises causing an aliphatic alcohol having at least 8 carbon atoms in the molecule to react in the presence of a catalyst capable of splitting off water at a temperature between about 200° and about 425° C. under a pressure of at least 50 atmospheres with an aliphatic amine containing at least 1 hydrogen atom directly attached to a nitrogen atom, any alkyl radicle of the said amine containing at most 5 carbon atoms.

3. The process of producing amines containing at most 1 hydrogen atom directly attached to a nitrogen atom which comprises causing an aliphatic alcohol having at least 8 carbon atoms in the molecule to react in the presence of a catalyst capable of splitting off water at a temperature between 300° and 400° C. under a pressure of at least 50 atmospheres with an aliphatic amine containing at least 1 hydrogen atom directly attached to a nitrogen atom, any alkyl radicle of the said amine containing at most 5 carbon atoms.

4. The process of producing amines containing at most 1 hydrogen atom directly attached to a nitrogen atom which comprises causing an aliphatic alcohol having at least 8 carbon atoms in the molecule to react in the presence of a catalyst capable of splitting off water at a temperature between about 350° and about 370° C. under a pressure of at least 50 atmospheres with an aliphatic amine containing at least 1 hydrogen atom directly attached to a nitrogen atom, any alkyl radicle of the said amine containing at most 5 carbon atoms.

5. The process of producing amines containing at most 1 hydrogen atom directly attached to a nitrogen atom which comprises causing a mixture of aliphatic alcohols having at least 8 carbon atoms in the molecule to react in the presence of a catalyst capable of splitting off water at a temperature between about 200° and 425° C. under a pressure of at least 50 atmospheres with an aliphatic amine containing at least 1 hydrogen atom directly attached to a nitrogen atom, any alkyl radicle of the said amine containing at most 5 carbon atoms.

6. The process of producing amines containing at most 1 hydrogen atom directly attached to a nitrogen atom which comprises causing an aliphatic alcohol having at least 8 carbon atoms in the molecule to react in the presence of a catalyst capable of splitting off water at a temperature between about 200° and about 425° C. under a pressure of from 150 to 200 atmospheres with an aliphatic amine containing at least 1 hydrogen atom directly attached to a nitrogen atom, any alkyl radicle of the said amine containing at most 5 carbon atoms.

KARL SMEYKAL.